United States Patent
Plotnikoff

[15] 3,686,409
[45] Aug. 22, 1972

[54] COMBINATION OF L-DOPA AND 2-IMINO-5-PHENYL-4-OXAZOLIDINONE USED TO TREAT PARKINSON'S DISEASE

[72] Inventor: Nicholas Peter Plotnikoff, Lake Bluff, Ill.

[73] Assignee: Abbott Laboratories, Chicago, Ill.

[22] Filed: Jan. 27, 1971

[21] Appl. No.: 110,253

[52] U.S. Cl....................................424/272, 424/319
[51] Int. Cl. ................................................A61k 27/00
[58] Field of Search................................424/272, 319

[56] References Cited

UNITED STATES PATENTS 3,108,045  10/1963  Candon et al. ............424/272

OTHER PUBLICATIONS

Chem. Abst., Vol. 63, 2279e (1965).

*Primary Examiner*—Stanley J. Friedman
*Attorney*—Robert L. Niblack

[57] ABSTRACT

Covers a composition comprising the combination of l-dopa and 2-imino-5-phenyl-4-oxazolidinone and salts thereof and use of said composition in treating Parkinson's disease.

4 Claims, No Drawings

COMBINATION OF L-DOPA AND 2-IMINO-5-PHENYL-4-OXAZOLIDINONE USED TO TREAT PARKINSON'S DISEASE

BACKGROUND OF THE INVENTION

Parkinsonism is generally characterized by involuntary tremors, diminished motor power, and rigidity. The onset of the disease is insidious, with increasing rigidity or tremor or both. The patient's facial expression may be fixed or less mobile than normal; smiling spreads and slowly disappears. Body movements generally become slower. There may be gradually increased rigidity with diminished swaying of the arms during walking. Generally, the patient's legs may begin to feel stiff and excessive effort may be required to lift them from the ground while walking. Patients often assume a stooping posture and shuffle rather than walk. As the disease progresses, movements such as adjusting a tie, buttoning a coat, etc., become impossible.

The disease is usually slowly progressive and patients may live for many years. However, with increased disability, patients often become depressed, anxious, and emotionally disturbed. While treatment with various drugs such as antispasmodics, central nervous system stimulants and the like have been used along or in combination to produce temporary amelioration of complaints, l-dopa was the first effective single agent in the treatment of the disease.

L-dopa has been reported to be effective against the akinesia and rigidity of Parkinsonism, particularly in extremely severe cases. An increase in mental alertness and wakefulness, relief from depression and an increase in intellect has also been observed.

While l-dopa has produced some rather promising results in experimental therapy, in some instances it does not show benefits unless used in relatively large amounts. This causes undesirable side effects such as nausea, vomiting, hypotension and abnormal involuntary movements as well as mental changes.

It would, therefore, be a significant advance in the art if some means of potentiating l-dopa were found whereby the resultant new composition could be used to effectively treat Parkingson's disease at relatively low dosage levels, and thus the above unwanted side effects as well as others are avoided.

SUMMARY OF THE INVENTION

It, therefore, becomes an object of the invention to provide a composition useful in treating Parkinsonism. A specific object of the invention is to provide a method of treating Parkinsonism with a drug exhibiting a low level of side effects, if any, and which does not become tolerated over extended usage. Essentially the invention here is concerned with a composition useful in treating Parkinson's disease, said composition comprising in combination l-dopa and 2-imino-5-phenyl-4-oxazolidinone or a salt thereof.

DETAILED DESCRIPTION OF THE INVENTION

L-dopa or 3-(3,4-dihydroxyphenyl)-L-alanine is, of course, well known, as is 2-imino-5-phenyl-4-oxazolidinone. However, it is believed that the combination is novel as well as their combined use in treating Parkinsonism. It was found here that the oxazolidinone markedly potentiates the activity of l-dopa as an anti-Parkinsonism drug and that the combined treatment appears to act in a synergistic manner.

Typical compositions of the invention will be constituted in the ratio of 0.05–4.0 parts of oxazolidinone per 1.0 part of l-dopa. More often said ratio is 0.1–2.0 parts oxazolidinone per 1.0 part of l-dopa.

For use in treating Parkinson's disease, the above composition may be administered in either liquid or solid form. Thus, the active compounds may be provided in granulation, tablet, capsule, elixir and other dosage forms. Oral administration is preferred and is the most convenient. Other means of administration may be employed such as, for example, by intraperitoneal or intramuscular injection. The active ingredients can also be incorporated in an oil or wax base and administered in the form of a suppository.

When administered in a unit dosage form, the active ingredients comprising l-dopa and oxazolidinone will be present in a total amount of 5–100 milligrams, more often 5–50 milligrams accompanied by a pharmaceutically acceptable carrier.

The compositions of the invention are found to be effective in humans at a dosage range of from about 0.1 to about 400 mg./kg. of body weight daily. More often the dose is 1–200 mg./kg.

EXAMPLE I

One basic approach for evaluation of anti-Parkinson activity is estimating reversal of the extrapyramidal effects of deserpidine which depletes biogenic amines in animals and in man, which test was employed here.

Specifically, deserpidine was administered to mice 24 hours prior to the test at a level of 50 mg./kg. The deserpidine was administered orally.

Twenty-four hours after administering the deserpidine, l-dopa was then given by intraperitoneal injection at 100 mg./kg. The l-dopa had no effect in reversing the effects of deserpidine. It was given a rating of 0. In this test a rating of 0 indicates no effect; a rating of 1 indicates slight effect; a rating of 2 indicates moderate effect and a rating of 3 indicates marked effect or complete reversal.

When a combination treatment involving l-dopa and 2-imino-5-phenyl-4-oxazolidinone was employed, definite reversal of the deserpidine effects were noted. Specifically, the two compounds were administered to mice with with the l-dopa dosage being held constant and the oxazolidinone dosage being varied. Table I shows the results of this test, and specifically points out the definite potentiation of l-dopa by the combination with oxazolidinone.

TABLE I

| 2-imino-5-phenyl-4-oxazolidinone | l-dopa | Rating |
|---|---|---|
| 10 mg./kg. | 100 mg./kg. | 1 |
| 20 mg./kg. | 100 mg./kg. | 2 |
| 40 mg./kg. | 100 mg./kg. | 3 |

EXAMPLE II

In this series of tests, the compositions of the invention were evaluated as to their reversal of deserpidine effects wherein Rhesus monkeys were the animals treated here. Eighteen hours prior to the test the monkeys were given 20 mg./kg. of deserpidine orally. Eighteen hours after this administration, l-dopa was administered alone at a level of 25 mg./kg. No effect upon deserpidine symptoms was noted with use of l-dopa here.

As in Example I, use of 2-imino-5-phenyl-4-oxazolidinone markedly potentiates the effects of l-dopa. Specifically, 2 mg./kg. of oxazolidinone was administered along with 25 mg./kg. of l-dopa. Complete reversal of the deserpidine effects was now realized. That is, the sedative effects of deserpidine were completely reversed by use of the combination of chemicals.

While in the above examples l-dopa and 2-imino-5-phenyl-4-oxazolidinone were administered separately, it is understood, of course, that the two materials may be combined and administered at one time, with the preferred ratio of the two being as set out above.

It is understood, of course, that in addition to use of the above salts or bases in combination with 2-imino-5-phenyl-4-oxazolidinone itself, salts of the oxazolidinone compound may also be employed here. This particular oxazolidinone is a relatively weak acid, and therefore salts may be formed via combination with a strong base. For example, alkali metal salts may be formed such as the sodium, lithium, etc. salts. In addition, alkaline earth metal salts such as the calcium salt may also be formed. Normally, these salts are formed by reacting the oxazolidinone with a strong alkali metal or alkaline earth metal base or anhydride such as sodium hydroxide, potassium hydroxide, lithium hydroxide, calcium hydroxide etc., or sodium hydride, calcium hydride.

What is claimed is:

1. A method of treating a patient suffering from Parkinson's disease which comprises administering to said patient at least an effective dosage of a composition comprising in combination l-dopa and 2-imino-5-phenyl-4-oxazolidinone or a salt thereof, said composition being constituted in the ratio of 0.05–4.0 parts of oxazolidinone or salt per 1.0 part of l-dopa.

2. The method of claim 1 wherein said dosage range is from 0.1 to about 400 mg./kg. of body weight daily.

3. The method of claim 2 wherein said dosage range is 0.1–200 mg./kg.

4. The method of claim 1 wherein l-dopa is administered separately from the administration of oxazolidinone.

* * * * *